June 14, 1960 HIDEO SEKI 2,941,038

MULTIPLEX TELEPHONE SYSTEM

Filed Oct. 20, 1954 4 Sheets-Sheet 1

INVENTOR.
Hideo Seki

BY Michael S. Striker
Agent

INVENTOR.
Hideo Seki

BY

Michael S. Striker
Agent

INVENTOR.
Hideo Seki
BY
Michael S. Striker
Agent

INVENTOR.
Hideo Seki
BY
Michael S. Striker
Agent

United States Patent Office 2,941,038
Patented June 14, 1960

2,941,038

MULTIPLEX TELEPHONE SYSTEM

Hideo Seki, Setagaya-ku, Tokyo, Japan, assignor to Iwasaki Tsushinki Kabushiki Kaisha, Tokyo, Japan, a corporation of Japan Filed Oct. 20, 1954, Ser. No. 463,515

Claims priority, application Japan Oct. 26, 1953

8 Claims. (Cl. 179—15)

My invention relates to speech current transmission systems and it has a particular relation to compressed-frequency-band or interrupted telephone systems of high efficiency wherein a speech current of sub-divided frequency band is sampled alternatively at proper time duration and period, while the gaps of the interrupted speech current are filled up at the receiving side with delayed speech by means of magnetic recording.

Prior to my invention, two important systems have been known for multiplexing speech communications. One system is the frequency division system and the other is the time division system. It is impossible, in general, to increase the number of channels by either of these two systems unless the frequency band is enlarged more in width than that of the single telephone channel.

Heretofore, such a system as called the Vocoder was invented by Dr. H. Dudley which is based upon steps of sampling with respect to frequency at the transmitter side and of remaking speech at the receiving side. There needs, however, expensive terminal equipments in order to carry out the system, so as to meet the commercial applications.

One object of my invention is to improve the prior system so as to overcome more inexpensively the foregoing defects.

Another object of my invention is to provide a novel improved system which may be installed and operated more efficiently and more economically.

Still another object of my invention is to provide a novel improved system to be advantageously applied to important telephone systems concerning human speech such as the highly efficient multiplex telephone, the highly secret telephone, telephone communication through a low grade channel, telephone communication through the line with periodic noise, and a two way telephone system to be used instead of the vodas.

A still further, and more specific, object of my invention is to provide a novel improved system whereby the stop sounds such as p, t, k, b, d and g may be kept distinctively at the receiving side.

These and other objects will become apparent in the course of the following description of the invention.

In general, this invention consists in combining narrower-than-usual frequency division systems with slower-than-usual speed time division systems. According to my invention, the system, in general, comprises subdividing a speech frequency band into narrower multiple bands at the transmitter side, the speech current in each band being timely sampled, then transmitting the bands into a channel alternatively, the speech current in each band having blanks or silent intervals periodically, selecting the speech current of each band by change over switches or relays in synchronization with the transmitter side, rearranging the speech current in the same order with respect to both frequency and time, and finally filling up the silent intervals of speech current by interpolation, e.g. with delayed speech current.

The system according to this invention is denominated

"Frequency-alternative slow-time-division telephone system," or in short, "Fasit" by the inventor.

In describing the invention reference will be made to the accompanying drawings in which.

Figure 1:
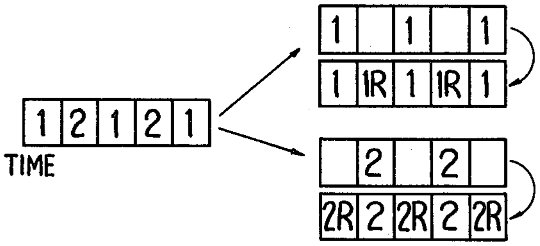
Fig. 1 shows the relation between time and frequency of a simple system wherein a speech current is transmitted in two channels alternatively.

Before entering into a particular explanation of my invention, a simple system will be explained as a preparation for the explanation given hereinafter. Now referring to Fig. 1, where the abscissa shows time while the ordinate shows frequency of a speech current to be transmitted through a line, the numerals 1 and 2 represent the sampling current of channel No. 1 and that of channel No. 2, respectively. They are transmitted alternatively at a constant period, say 50 to 100 ms., instead of a period, such as 125 μs., used in the conventional time division multiplex telephone system in which a wider frequency band is required than the voice frequency band. As an example, when a period of 80 ms. is selected, the former interval 40 ms. of this period being allocated for the channel No. 1, while the latter 40 ms. for the channel No. 2, it will be clear that, at the receiving side, the speech current selectively separated by synchronous relays in each channel may have a blank or silent time interval of 40 ms. during each of the periods. Such an interrupted speech shows a low grade articulation which is objected to in the practical conversation. This difficulty may be overcome and articulation may be improved very much when the silent time gaps are filled up with each preceding speech current which has been delayed, e.g. as 1R and 2R in Fig. 1 by recorder heads.

A vital defect of the above simple system consists in missing stop sounds frequently such as p, t, k, b, d and g, because their time durations are shorter than 40 ms. of the blank time gap left between two sampling periods. Only unexpectably, these stop sounds may fall into the sampling periods.

Figure 2:
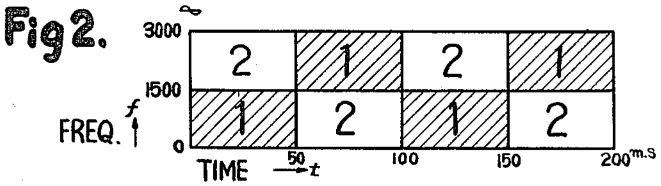
Fig. 2 shows the relation between time and frequency of a speech current in a two-band two-telephone-channel system of an embodiment of this invention.

This defect is eliminated in system for two-telephone-channel multiplexing according to this invention. Referring to Fig. 2 where, similarly to Fig. 1, the abscissa shows time scale while the ordinate indicates frequency. In this case, a speech frequency band must be divided into two parts which are sampled alternatively with respect to time. In this system, a part of each channel voice can always be transmitted through the line. On the other hand, short duration consonants such as stop sounds spread usually over the wider frequency range than those of longer sounds. Accordingly, the stop sounds may be captured by either of the two frequency bands, if the sampling is effected in a manner of the slow speed time division alternatively in frequency. And thus the discrimination of stop sounds may always be brought in possible.

Figure 3:
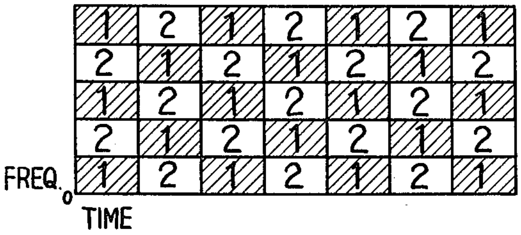
Fig. 3 shows the relation between time and frequency of a speech current in a five-band two-telephone-channel system.

Alternatively, a two-telephone-channel multiplexing is embodied by means of dividing the speech frequency band into more than two bands as shown in Fig. 3. Although this system requires a number of filters and complicated circuits for interruption and recording, articulation may be improved very much. However, when the number of the filters are too great, degradation occurs due to the transient phenomena.

Figure 4:
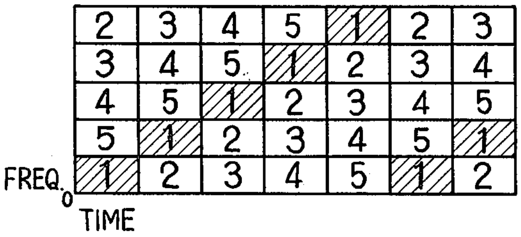
Fig. 4 shows the relation between time and frequency of a speech current in a five-band five-telephone-channel system where the channels are arranged regularly.

Furthermore, a five-telephone-channel multiplexing can be achieved by dividing the speech frequency into five bands and by transmitting each band current being sampled regularly as well as alternatively, as shown in Fig. 4.

Figure 5:
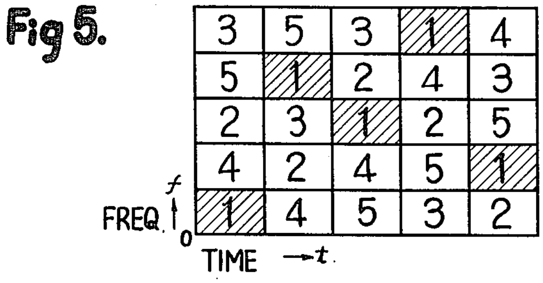
Fig. 5 shows the relation between time and frequency of a speech current in another five-band five-telephone-channel system where the channels are arranged irregularly so as to be useful for a secret service.

Fig. 5 shows another example of multiplexing five channels, in which case sampled elements are interchanged in irregular order with respect to both time and frequency. This example may be used for secret communication of higher order than those used heretofore.

Figure 6:
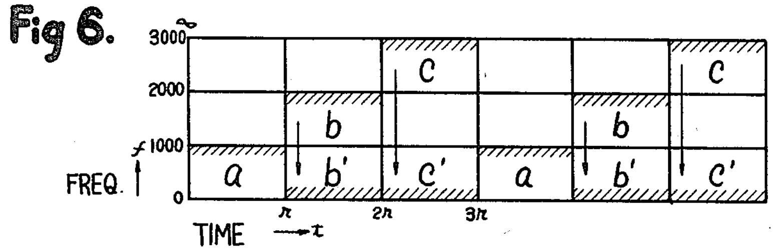
Fig. 6 shows the relation between time and frequency of a speech current of still another embodiment where a frequency band is trisected.

Fig. 6 shows a case where the multiplexing needs not, but compression of a single channel band in width is necessary. That is to say, the sub-divided band $b$ in Fig. 6 is converted to the band $b'$ by virtue of a frequency convertor, while the band $c$ is converted to the band $c'$ by similar means.

Figure 7:
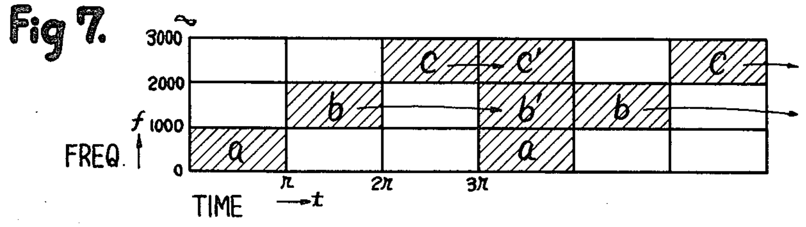
Fig. 7 shows the relation between time and frequency of a speech current of still further embodiment where a frequency band is trisected in another manner.

Fig. 7 shows a case of time saving, i.e. an element sampled at frequency band $b$ is transferred to the horizontal direction until $b'$ by means of such a delaying device as magnetic recording, while $c$ is transferred to $c'$ by the same means. Thus all speech elements sampled at each band can be concentrated to a time duration of $1/n$ of each sampling period and the rest duration of $(n-1)/n$ of the period can be left blank or silent during transmission. This system is especially useful for eliminating periodic industrial noise.

Several circuits embodying the system of the present invention will now be described.

*Example I*

Figure 8:
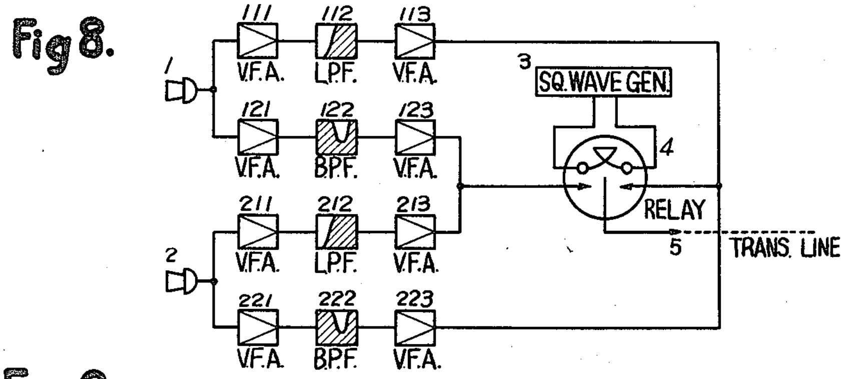
Fig. 8 shows a diagram of a sending side of the two-band two-telephone-channel system.
Figure 9:
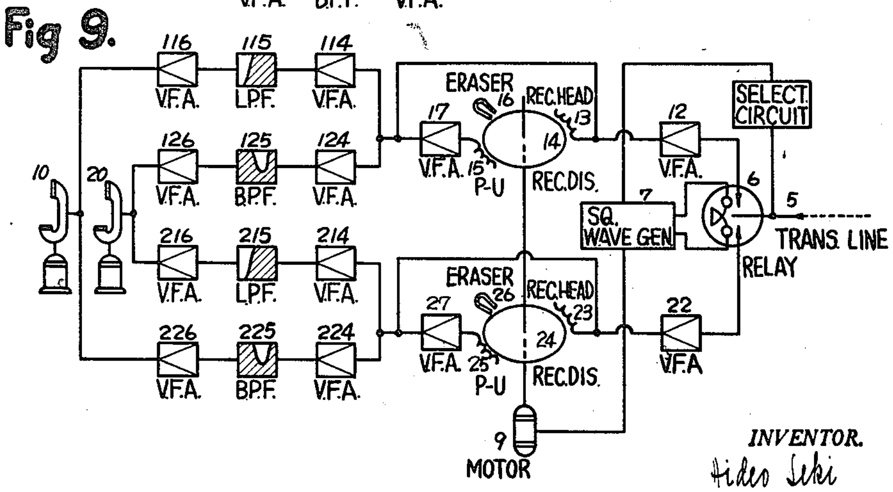
Fig. 9 shows a diagram of a receiving side of the two-band two-telephone-channel system.

An example of schematic circuit for a frequency-alternative and slow-interrupted-time-division system is shown in two diagrams, i.e. Fig. 8 showing the transmitter side and Fig. 9 showing the receiver side. In Figs. 8 and 9, characters and numerals are used as follows:

Reference numerals 1, 2 are microphones;

Reference numerals 111, 121, 211, 221, 113, 123, 213, 223, 12, 22, 17, 27, 114, 124, 214, 224, 116, 126, 216, 226 are voice frequency amplifiers;

Reference numerals 112, 212, 115, 215 are low pass filters;

Reference numerals 122, 222, 125, 225 are band pass filters;

Reference numerals 3, 7 are square wave generators;

Reference numerals 4, 6 are relays;

Reference numeral 5 is transmission line;

Reference numeral 8 is selective circuit for synchronizing current;

Reference numeral 9 is motor;

Reference numerals 10, 20 are receivers;

Reference numerals 14, 24 are magnetic discs;

Reference numerals 13, 23 are recorder heads;

Reference numerals 15, 25 are pick-ups;

Reference numerals 16, 26 are erasers.

In Fig. 8, microphones 1, 2 of the transmitter side generate speech current of a certain frequency band, 0–1500 c.p.s. of which passes through low pass filters 112, 212 and 1500–3000 c.p.s. of which passes through band pass filters 122, 222. Each output of these filters is combined with the output of the opposite band filters. These currents are interchanged by mechanical or electrical relays 4 periodically at a constant frequency, say 20 c.p.s., the relays being controlled by a square wave generator 3. It will thus be clear that the line current is constituted by the lower frequency of the No. 1 channel and the higher frequency of the No. 2 channel during the first 0–50 ms. Its constitution is interchanged when the first 50 ms. ends and left during the next 50–100 ms., for example, as shown in Fig. 2.

As the frequency bands are periodically alternated, the received speech current after selection and interpolation may be felt by our hearing sense as a continuous speech, just as the manner in the case of television where interlaced scanning is the usual practice. But the speech current in the line may be considered as a secret telephone of a certain grade, because the two channels are mixed and its mutual relation is periodically interchanged.

In Fig. 9, a square wave generator 7 and a motor 9 at the receiving side are synchronously controlled with each other by the synchronous current extracted from the selective circuit 8 for synchronizing component. The control may be semi-independent, if required, and may be intermittently synchronized by the rectified output of the interrupted speech.

The speech current in question is divided by the relay 6 with respect to time and derived to the recording heads 13, 23 located in operative proximity to the magnetic discs 14, 24 which are driven co-axially by the motor 9. These recorded speech currents are picked up by the pick-ups 15, 25 being delayed, for example, 50 ms. from the arrived speech currents $a$ and $b$. Then these two groups of currents are respectively combined in parallel and separated by filters (L.P.F. 115, 215 and B.P.F. 225, 125) into two channels. Finally, by combining the L.P.F. output of the first group with the B.P.F. output of the second group, the channel No. 1 is produced at the receiver 10. Similarly, by combining the B.P.F. output of the first group with the L.P.F. output of the second group, the channel No. 2 is modified at the receiver 20. In filling up the time gaps of the interrupted speech, it was found from actual tests that it is practical to arrange two group of pick-ups each 50 ms. apart around the two magnetic discs and to combine the outputs of the two pick-ups respectively, instead of combining the arrived speech current with the output current of the pick-up.

In all the cases given above, each voice current is amplified by audio frequency amplifiers 111, 121, 211, 113, 123, 213, 223, 12, 22, 17, 27, 114, 124, 214, 224, 116, 126, 216, and 226 and the recorded currents must be erased by erasers 16, 26 at each revolution of the magnetic discs.

*Example II*

Figure 10:
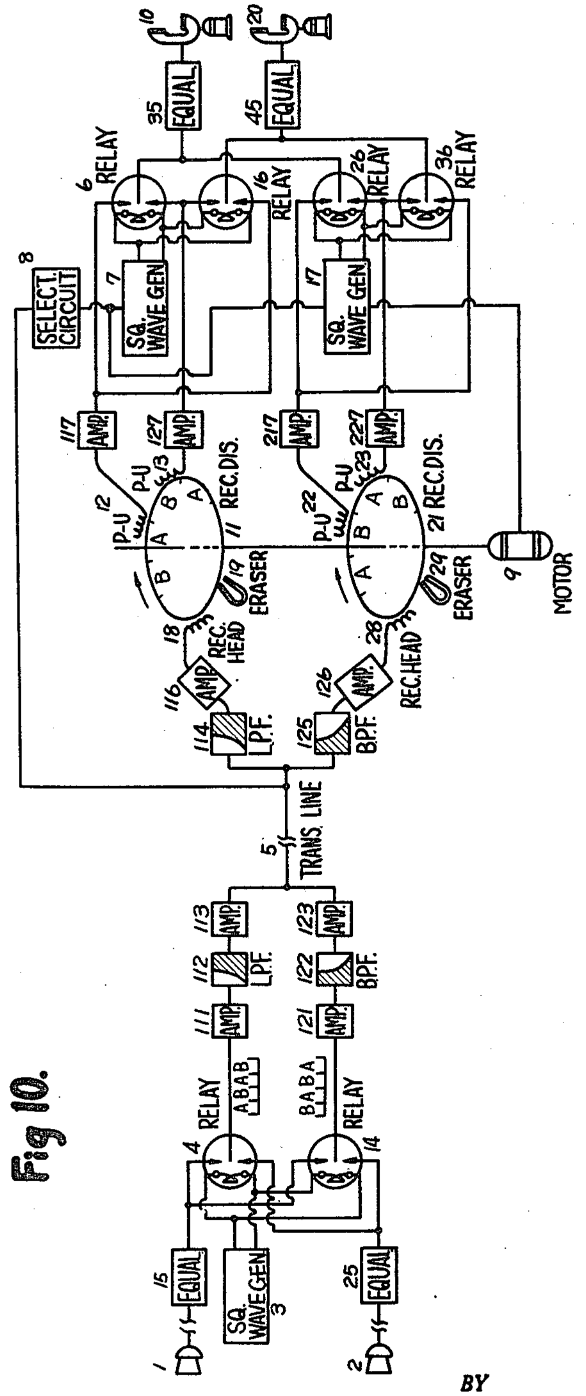
Fig. 10 shows a diagram comprising a sending end and a receiving end of another two-band two-telephone-channel system.

Another example of a schematic circuit for a frequency-alternative and slow-interrupted-time-division system is shown in Fig. 10. This is an improvement over the former type in view of the fact that a number of filters and electron tube relays are eliminated from the economical stand-point. In Fig. 10, the following characters and numerals are used:

Reference numerals 1, 2 are transmitters;

Reference numerals 15, 25, 35, 45 are equalizers;

Reference numerals A, B are speech currents from the transmitters 1, 2;

Reference numerals 111, 113, 116, 117, 121, 123, 126, 127, 217, 227 are amplifiers;

Reference numerals 112, 114 and low pass filters (L.P.F.);

Reference numerals 122, 125 are band pass filters (B.P.F.);

Reference numerals 3, 7, 17 are square wave generators;

Reference numerals 4, 6, 14, 16, 26, 36 are relays;

Reference numeral 5 is a transmission line;

Reference numeral 8 is a synchronizing current selector circuit;

Reference numeral 9 is a motor;

Reference numerals 10, 20 are receivers;

Reference numerals 11, 21 are magnetic recording discs;

Reference numerals 18, 28 are recording heads;

Reference numerals 12, 13, 22, 23 are pickups;

Reference numerals 19, 29 are erasers.

At the sending end, speech currents A of the No. 1 channel and B of the No. 2 channel with 3000 c.p.s. bandwidth are interrupted or changed over at first with respect to time by relays 4 and 14 which are controlled by a square wave generator 3 of a frequency, of for example, 20 c.p.s. Then, the output current of the first circuit group is alternated in the order of A—B—A—B, while that of the second circuit group is alternated in the order of B—A—B—A which repeat every 50 ms., for example. One of these two groups is passed through a low pass filter 112 of 0–1500 c.p.s. and the other is passed through a band pass filter of 1500–3000 c.p.s. If the outputs of these two filters are combined, we may get the signal into the line 5 as shown in Fig. 2.

At the receiving side, the received current is first supplied to a low pass filter 114 of the 0–1500 c.p.s. frequency band and to a band pass filter 125 of the frequency 1500–3000 c.p.s. frequency band.

At the same time, a synchronizing current is selected out through a selective circuit 8 and its output is led to and controls a motor 9 and square wave generators 7, 17 which in turn control relays 6, 16, 26, 36, which may comprise, for example, electron tube relays, mechanical relays, commutators or ring modulators. On the other hand, a recording head 18 records the output of L.P.F. of 0–1500 c.p.s. bandwidth in the order of A—B—A—B on the magnetic disc 11 coupled with the motor and a recording head 28 records the output of B.P.F. of 1500–3000 c.p.s bandwidth in the order of B—A—B—A on 21. These recordings are repeated periodically every 50 ms. The number of the pick-ups around the disc 11, in this case, is two, i.e., 12, 13. They are located 25 ms. apart from each other, their outputs being controlled by relays 6, 16, while those around disc 21 are 22, 23 located also 25 ms. apart from each other, their outputs being controlled by relays 26, 36. Thus, at receivers 10, 20, the speech of the first channel and the second channel may be reproduced, respectively, by a proper combination of the outputs of these relays. Equalizers 15, 25, 35, 45 are inserted to equalize the mean power density spectrum of the speech currents, and erasers 19, 29 are used for erasing the recorded sound at the end of every revolution of the magnetic discs 11, 21.

In short, the embodiment of Fig. 10 has the same features of the embodiments of Figs. 8 and 9, but has the additional advantage of eliminating a number of expensive filters. The level variation of sounds may be minimized by the use of the two pick-ups.

*Example III*

Figure 11:
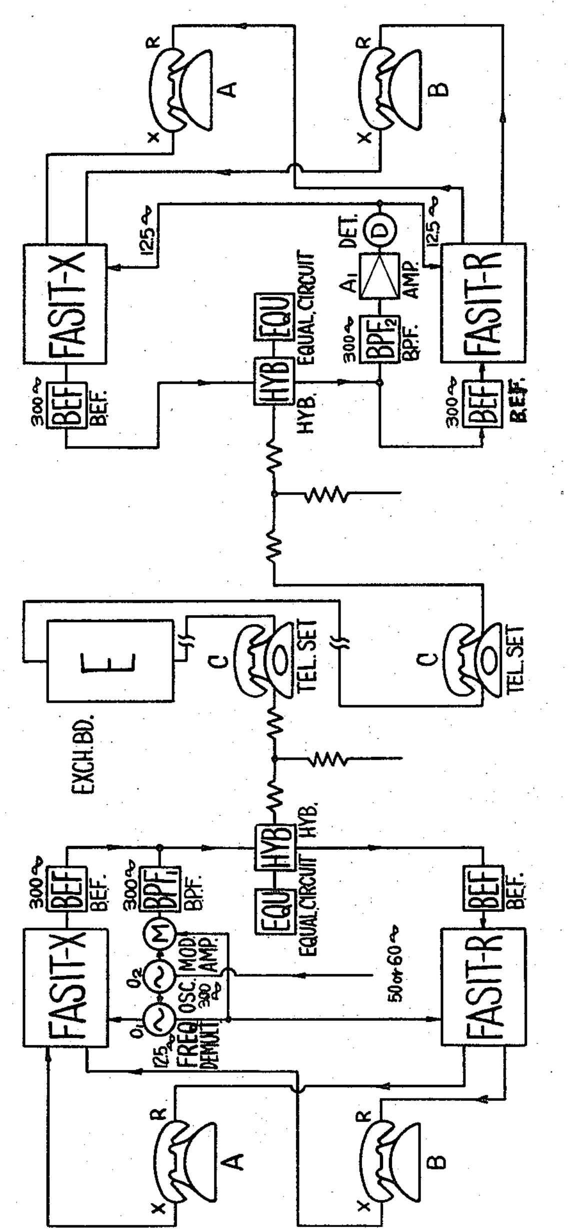
Fig. 11 shows an entire circuit of another telephone system wherein "Fasit" is inserted.

Fig. 11 shows a block diagram of the entire system of a long distance telephone system for the actual service according to the present invention. The block for the transmitter side is denominated Fasit-X of the frequency-alternative and slow-time-division multiplex telephone system, while that for the receiver side is denominated Fasit-R of the same. A and B are two telephone sets which are capable of communicating with each other according to this invention. C is an ordinary subscriber's telephone set. There must be an arrangement E such as a special service line or an ordinary line with an exchange board between the set of C. B.E.F. is a band elimination filter for eliminating synchronizing signals. HYB is a hybrid coil. EQU is an equalizing circuit.

A carrier wave of frequency 300 c.p.s. can be controlled by either of 50 or 60 c.p.s. from a power source line and 12.5 c.p.s. in this example can be obtained from the 300 c.p.s. carrier through a frequency divider. M is a modulated amplifier, where the carrier of 300 c.p.s. is amplitude-modulated by the 12.5 c.p.s. output. The synchronizing frequency of 12.5 c.p.s. can be obtained at the receiving side by detecting at a detector D the signal which is selected at a 300 c.p.s. band pass filter $BPF_2$ and amplified at an amplifier $A_1$. The output is an A.C. sine wave of frequency 12.5 c.p.s. and its phase should be properly adjusted in the Fasit-X and the Fasit-R. The wave is then connected to a square wave.

Synchronizing and ringing devices are not the essential parts of the system according to this invention, but they are necessary for an actual system. In Fig. 11, $O_1$,$O_2$, M, B.P.F.$_1$, B.P.F.$_2$, A and D constitute a synchronizing system. As a carrier frequency of the synchronizing signal, 300 c.p.s., 2700 c.p.s. or any other frequency being free from any disturbance with the communication may be chosen and is modulated by the synchronizing frequency 12.5 c.p.s., for example. This low frequency is separated at the receiving end, corrected in phase, deformed from the sine wave to a square wave by a proper slicer circuit and supplied to electron tube relays. Ringing is obtained easily in the systems according to this invention. In a two frequency band system, two carriers of frequencies, e.g. 500 c.p.s. in the first band and 2000 c.p.s. in the second band are modulated by the same ringing current of frequency 16 c.p.s. An AM signal of 16 c.p.s. always passes through the line, irrespective of the interruption, if we neglect the difference of carrier frequencies. So it is easy to get the 16 c.p.s. ringing current at the receiving end by detecting the signal and smoothing its output by a proper low pass filter. Therefore, subscribers may operate the telephone sets just as they would an ordinary telephone. It is also possible to interchange the speakers at the far end by reversing the phase of the synchronized relay control signal of the near end without changing the transmitted synchronizing signal.

The longer the communication line, the higher the economical value of this invention is, because an enormous amount of cable materials can be saved. The frequency band saving must be especially appreciated for use in radio communication, because frequency is used efficiently according to this invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the equivalence of the following claims.

Having now described my invention what I claim is:

1. In a multiplex telephone system wherein speech frequency signals are transmitted between a common transmitting station and a common receiving station by a plurality of speech channels over a common transmission line, in combination, filtering means for dividing the speech frequency signals appearing in each of the input channels connected to the common transmitting station into divided speech frequency signals being respectively in a plurality of different frequency ranges; means for simultaneously transmitting to the receiving station for predetermined time periods divided speech frequency signals from each of said channels, each of said simultaneously transmitted divided speech frequency signals being in a respectively different frequency range; relay switch means for periodically changing at the end of each of said time periods the signals from each channel from one to another one of the different frequency ranges into which the particular signal has been divided so that the simultaneously transmitted divided speech frequency signals from each of said channels are always in respectively different frequency ranges, the distribution of said frequency ranges changing periodically; means at said receiving station for separating respectively the combined signals simultaneously transmitted at different frequencies during one time period from the combined signals transmitted during the other time periods; and means for combining those divided speech frequency signals contained in each of said combined signals separated at said receiving station which correspond to the same channel connected to said common transmitting station.

2. In a multiplex telephone system wherein speech frequency signals are transmitted between a common transmitting station and a common receiving station by a plurality of speech channels over a common transmission line, in combination, filtering means for dividing the speech frequency signals appearing in each of the input channels connected to the common transmitting station into divided speech frequency signals being respectively in a plurality of different frequency ranges; means for simultaneously transmitting to the receiving station for predetermined time periods divided speech frequency signals from each of said channels, each of said simultaneously transmitted divided speech frequency signals being in a respectively different frequency range; relay switch means for periodically changing at the end of each of said time periods the signal from each channel from one to another one of the different frequency ranges into which the particular signal has been divided so that the simultaneously transmitted divided speech frequency signals from each of said channels are always in respectively different frequency ranges, the distribution of said frequency ranges changing periodically; switching means at said receiving station for separating respectively the combined signals simultaneously transmitted at different frequencies during one time period from the combined signals transmitted during the other time periods; and filtering and time delay means for combining those divided speech frequency signals contained in each of said combined signals separated at said receiving station which correspond to the same channel connected to said common transmitting station.

3. A frequency-alternative slow-time-division multiplex telephone system comprising, circuit means at the sending end including filters and a first change-over switch for dividing a speech frequency into a plurality of divisional frequency bands of proper width by means of said filters, then periodically time-dividing said divisional frequency bands into time-divided frequency bands by means of said first change-over switch; a single transmitting line connected at one end to said circuit means; means for transmitting said time-divided frequency bands as speech signals with blanks alternately with other speech signals divided in the same manner through said single transmitting line, with said blanks filled up by samples of the last-named signals; second circuit means at the receiving end connected to the other end of said transmitting line and including a second change-over switch, for selecting desired channels with respect to time by means of said second change-over switch, said second switch being adapted to be operated synchronously with said first change-over switch; interpolating means connected in circuit with said second change-over switch and including recording and delaying means for filling up the blanks of the speech signals by said recording and delaying means; and filter means in circuit with said interpolating means for re-arranging said frequency bands in their original order.

4. A frequency-alternative slow-time-division multiplex telephone system comprising, circuit means at the sending end including filters and a first change-over switch for dividing a speech frequency into a plurality of divisional frequency bands of proper width by means of said filters, then periodically time-dividing said divisional frequency bands into time-divided signals by means of said first change-over switch; concentrating means connected to said circuit means and including a frequency converter for concentrating said time-divided signals appearing in multiple frequency bands into a specified band of concentrated speech signals; a single transmitting line connected to said concentrating means; means for transmitting said concentrated speech signals with blanks alternately with other speech signals divided in the same manner through said single transmitting line, with said blanks filled up by samples of the last-named frequencies; second circuit means at the receiving end connected to the other end of said transmitting line and including a second change-over switch, for re-arranging said concentrated signals into the original order of frequency bands, and for selecting desired channels with respect to time by means of said second change-over switch, said second switch being adapted to be operated synchronously with said first change-over switch; interpolating means connected in circuit with said second change-over switch and including recording and delaying means for filling up the blanks of speech signals by said recording and delaying means; and filter means in circuit with said interpolating means for re-arranging said signals in their original order.

5. A frequency-alternative slow-time-division multiplex telephone system comprising, circuit means at the sending end including filters and a first change-over switch for dividing a speech frequency into a plurality of divisional frequency bands of proper width by means of said filters, then periodically time-dividing said divisional frequency bands into time-divided frequency bands by means of said first change-over switch; delaying means connected to said circuit means for displacing at least one band of said plurality of divisional frequency bands with respect to time so as to obtain at least one displaced band and at least one non-displaced band; a single transmitting line connected to said delaying means; means for transmitting said displaced band containing speech signals and said non-displaced band with other speech signals divided in the same manner through said single transmitting line, and for causing common blanks with respect to time to appear periodically, and other blanks to be filled up by samples of the last-named signals; second circuit means at the receiving end connected to the other end of said transmitting line and including demodulator means and a second change-over switch, for demodulating the displaced band with respect to time by said demodulator means, and for selecting desired channels with respect to time by means of said second change-over switch, said second switch being adapted to be operated synchronously with said first changeover switch; interpolating means connected in circuit with said second change-over switch and including recording and delaying means for filling up the blanks of the speech signals by said recording and delaying means; and filter means in circuit with said interpolating means for re-arranging said frequency bands in their original order.

6. A frequency-alternative slow-time division multiplex telephone system comprising, circuit means at the sending end including filters and a first change-over switch for periodically time-dividing a speech signal by means of said first change-over switch into a time-divided frequency, then dividing said time-divided frequency into a plurality of divisional frequency bands of proper width by means of said filters; a single transmitting line connected at one end to said circuit means; means for transmitting said divisional bands with blanks alternately with other speech frequencies divided in the same manner through said single transmitting line, with said blanks filled up by samples of the last-named frequencies; and a second circuit means at the receiving end connected to said transmitting line and including filters, recording, delaying and pick-up means, and a second change-over switch, for recovering each frequency band by means of said filters to obtain recovered frequencies for recording the respective recovered frequencies, for picking up the recorded recovered frequencies as delayed and not delayed frequencies, respectively, for inserting the former into the blanks, and for selecting desired channels with respect to time by means of said second change-over switch, said second switch being adapted to be operated synchronously with said first change-over switch.

7. A frequency-alternative slow-time division multiplex telephone system comprising, circuit means at the sending end including filters and a first change-over switch for periodically time-dividing a speech frequency into a time-divided frequency band composed of samples having an interrupting period of as long as from 1/12 to 1/25 second by said first change-over switch, then dividing said time-divided frequency band into a plurality of divisional frequency bands of proper width by means of said filters; a single transmitting line connected at one end to said circuit means; means for transmitting said divisional frequency bands with blanks alternately with other speech signals divided in the same manner through said single transmitting line with said blanks filled up by samples of the last-named signals; second circuit means at the receiving end connected to the other end of said transmitting line and including filters and a second change-over switch; and delaying means connected to said second circuit means for recovering each signal by means of said last-mentioned filters to obtain recovered frequencies, for recording the respective recovered frequencies and for picking up the recorded recovered frequencies as delayed and not delayed frequencies, respectively, said recording means including rotary magnetic recording disks, each of said disks being associated with a recording head, two pick-ups, and an eraser, for inserting the delayed sample into the blank, and for selecting desired channels with respect to time by means of said second change-over switch, said second switch being adapted to be operated synchronously with said first change-over switch.

8. In a multiplex telephone system wherein speech frequency signals are transmitted between a common transmitting station and a common receiving station by a plurality of speech channels over a common transmission line, in combination, means for dividing the speech frequency signals appearing in each of the input channels connected to the common transmitting station into divided speech frequency signals being respectively in a plurality of different frequency ranges; relay switch means for periodically changing at the end of each of a plurality of predetermined time periods the signals from each channel from one to another one of the different frequency ranges into which the particular signal has been divided so that the simultaneously transmitted divided speech frequency signals from each of said channels are always in respectively different frequency ranges, the distribution of the frequency ranges changing periodically, said relay switch means having a plurality of circuit closing positions and being connected between each of said channels and said common transmission line in a manner whereby a combination of divided speech frequency signals from each of said respective channels is successively connected for said predetermined periods to said common transmission line; means at said receiving station for separating respectively the combined signals simultaneously transmitted at different frequencies during one time period from the combined signals transmitted during the other time periods; and means for combining those divided speech frequency signals contained in each of said combined signals separated at said receiving station which correspond to the same channel connected to said common transmitting station.

References Cited in the file of this patent

UNITED STATES PATENTS

| | | |
|---|---|---|
| 2,098,956 | Dudley | Nov. 16, 1937 |
| 2,352,696 | De Boer et al. | July 4, 1944 |
| 2,559,644 | Landon | July 10, 1951 |
| 2,578,083 | Montani | Dec. 11, 1951 |
| 2,677,720 | Bedford | May 4, 1954 |
| 2,810,787 | Di Toro et al. | Oct. 22, 1957 |